A. L. ANDERSON.
MALTED MILK DISPENSER.
APPLICATION FILED MAY 22, 1915.
1,204,111.
Patented Nov. 7, 1916.
2 SHEETS—SHEET 1.
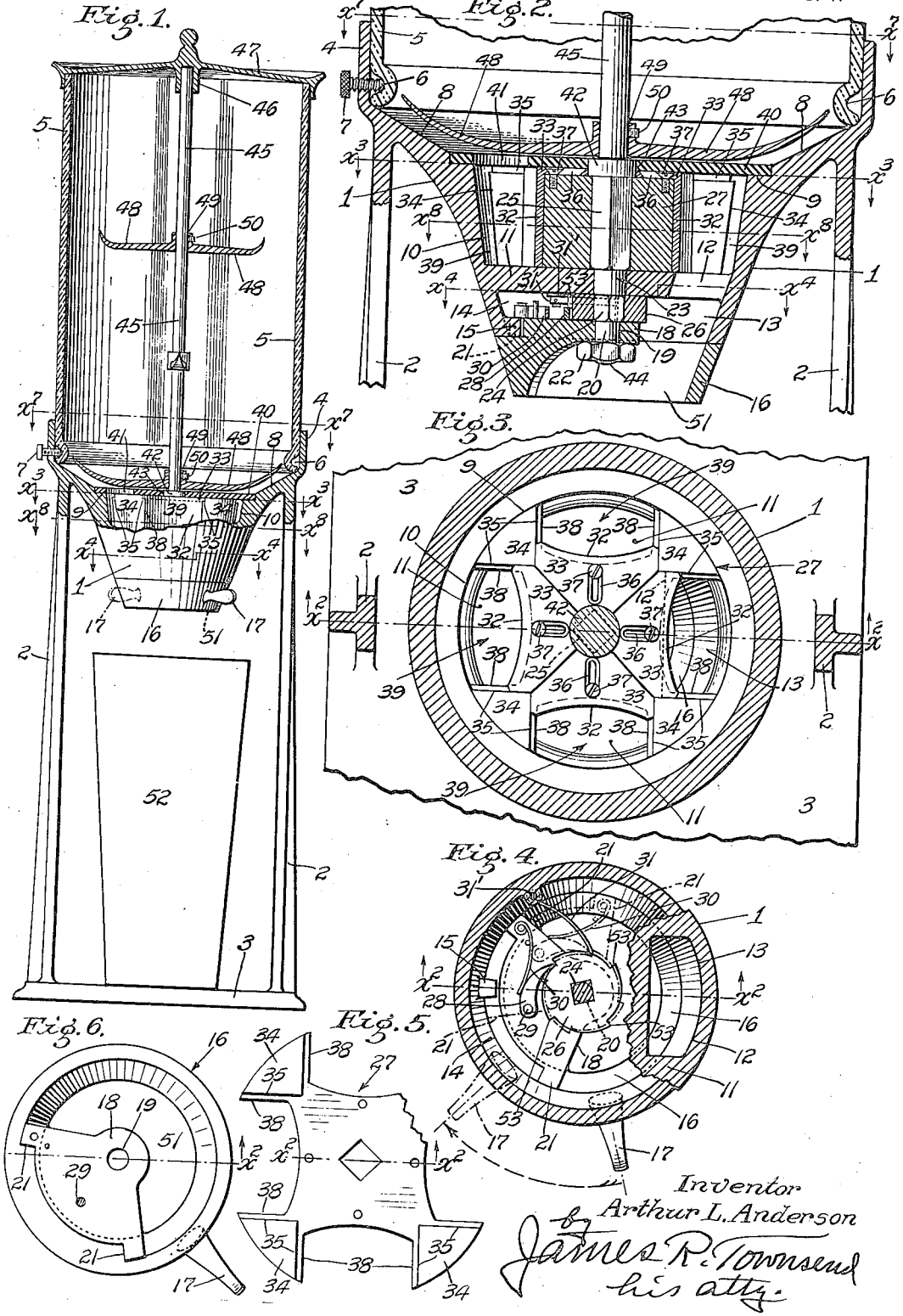
Inventor
Arthur L. Anderson
by James R. Townsend
his atty.

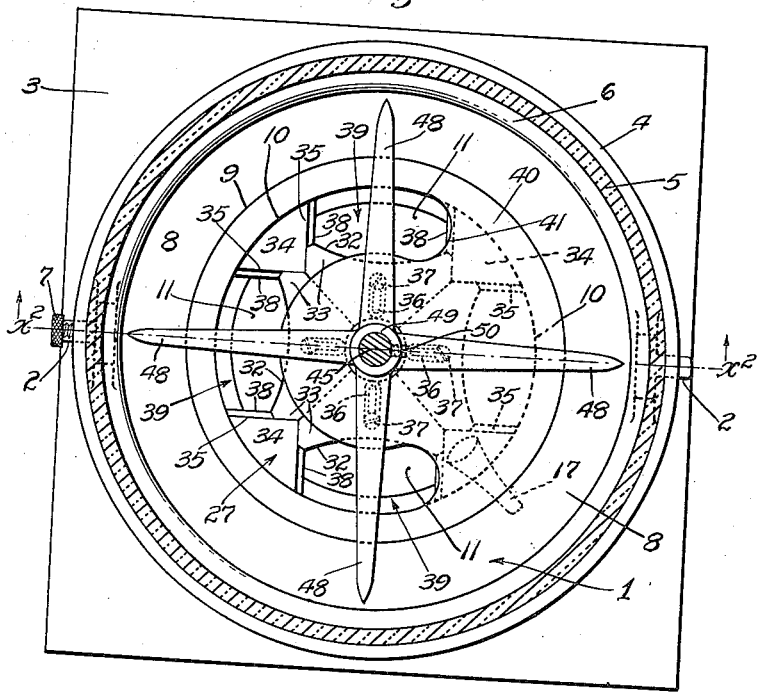
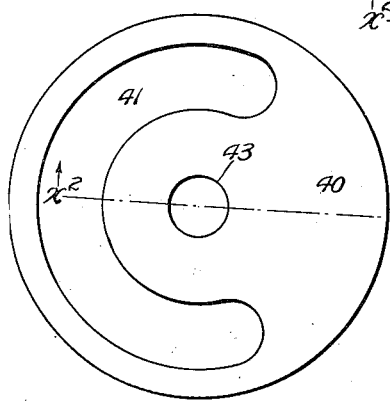
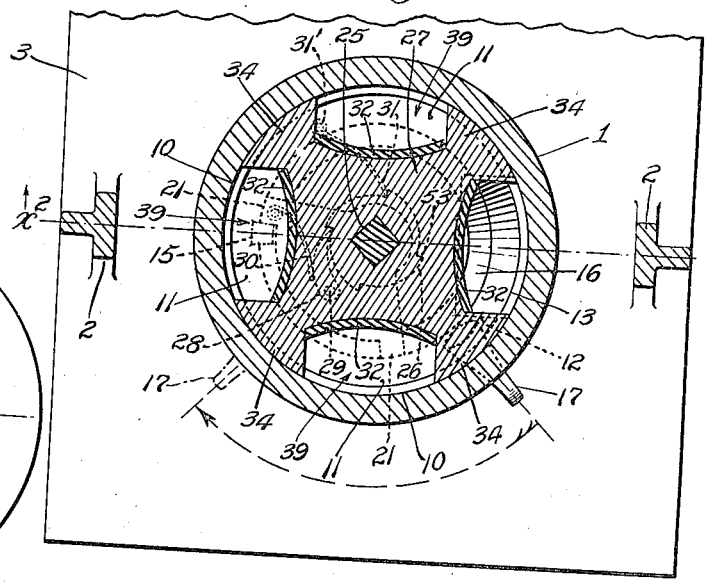

UNITED STATES PATENT OFFICE.

ARTHUR L. ANDERSON, OF LOS ANGELES, CALIFORNIA.

MALTED-MILK DISPENSER.

1,204,111.   Specification of Letters Patent.   Patented Nov. 7, 1916.

Application filed May 22, 1915. Serial No. 29,908.

*To all whom it may concern:*

Be it known that I, ARTHUR L. ANDERSON, a citizen of the United States, residing at Los Angeles, in the county of Los Angeles and State of California, have invented a new and useful Malted-Milk Dispenser, of which the following is a specification.

An object of the invention is to provide practical means for dispensing malted milk in measured quantities at soda fountains and elsewhere, where it is necessary to supply numerous customers with small amounts thereof. The material is expensive and if each customer is served with an excess over the amount calculated for the drink paid for, a considerable loss might result or the proper profits be reduced unfairly.

It is difficult to dispense malted milk on account of its stickiness and liability to cake, and it is usually kept in an open vessel from which it is dipped with a spoon. The amount thus dispensed is likely to be greater or less than the calculated amount despite the proper effort and design of the attendant dispensing it, thus giving different grades of drink where a certain grade might be expected.

An object of this invention is to provide means whereby measured charges of malted milk can be readily dispensed with practical uniformity.

The invention may be embodied in various ways and is adapted for dispensing other powdered substances.

The accompanying drawings illustrate the invention in a form at present deemed most desirable.

Figure 1 is an elevation, partly in section, of a malted milk dispenser constructed in accordance with this invention. Fig. 2 is an elevation, partly in section, on line indicated at $x^2$, Figs. 3, 4, 5, 6, 7, 8 and 9. Fig. 3 is a plan section on line $x^3$, Figs. 1 and 2. Fig. 4 is a plan section on irregular line $x^4$—$x^4$, Figs. 1 and 2. Fig. 5 is a fragmental detail of the charge delivering element detached and devoid of the gages. Fig. 6 is a plan of the actuating element. Fig. 7 is a plan section from line $x^7$, Figs. 1 and 2. Fig. 8 is a plan section from line $x^8$, Figs. 1 and 2. Fig. 9 is a plan of the guard plate detached.

A hopper 1 is mounted on standards 2 supported by a base 3 adapted to hold the apparatus upright. Said base is preferably sufficiently heavy for this purpose, so that the apparatus need not be fastened down but may be moved about on the top of a counter or other support. The rim 4 of the hopper extends upward and is shown as cylindrical, being thus adapted to receive a container 5 which is preferably a hollow cylindrical glass body open at both ends, and provided at its lower end with a recess 6 that may be an annular channel formed by bending in the cylinder 5 near its lower end. A set screw 7 screwed through the rim 4 enters the channel to hold the container in place. Within the rim 4 is provided a seat 9 below which is formed a chamber 10, and below said chamber a floor 11 having a passage 12 opening downward into the discharge way 13 at the lower end of the hopper, said seat 9 in the present instance being formed at the bottom of a sloping wall 8 that extends downwardly from the bottom of the rim 4. Said hopper extends considerably below the floor 11, thus providing an open space 14 above the level of a projecting lug 15 which serves as a stop to limit the movement of the actuating member 16 that is provided with a handle 17 and is pivoted by means of a bracket 18 having a hole 19 to receive a pivot 20 that is supported by the floor 11, the member 16 turning freely upon said pivot 20. The actuating member is also provided with two spacers 21 spaced apart and extending to engage the opposite sides of the stop formed by the lug 15, thus to limit the oscillation of the actuating device 16. A nut 22 retains the actuating device on the pivot 20. Said pivot is an extension from the rotary shaft that extends through a central circular opening 23 in floor 11 and said shaft is cylindrical to rotate in said opening and is of such construction above and below the cylindrical journal 23 as to afford suitable connection with elements that are to be rotated by said shaft. For this purpose, the shaft is shown constructed with angular portions 24, 25, and the ratchet wheel 26 is fixed to the angular portion 24 below the floor 11 and the charge delivering element 27 is mounted on the angular portion 25 inside the chamber 10. The pawl 28 is pivoted by a pin 29 to the actuating member and a spring 30 holds it in engagement with the ratchet wheel 26. A spring pawl 31 fixed at 31' to the hopper prevents the ratchet wheel from turning backward.

The charge delivering element may be constructed to deliver charges of different amounts, and with this object in view the gages comprising an upright transverse wall 32 and a top overhanging member 33 are mounted at the top of the charge-delivering element. Said element is constructed with radial arms 34 recessed to form parallel top ways 35 between each set of which the overhanging member 33 of a gage may slide, and said members 33 are provided with radial slots 36 through which screws 37 are inserted and screwed into the body 27 of the charge delivering element. The upright wall 32 of the gage device fits snugly between parallel sides 38 formed at the outer extremities of adjacent arms 34. The walls 38 thus form runways for the gage device between which the upright walls 32 move out and in to contract or expand the charge-receiving spaces 39 between the wall of the chamber 10 and the upright walls 38 and 32, said walls 32 being secured in place by the screws 37.

The charge delivering device, thus constructed of the body 27, radial arms 34 and the gage devices, fits snugly in the space between the floor 11 and the bottom of a guard plate 40 which is mounted in the seat 9 and fits snugly upon the top of the charge delivering device. Said guard plate is provided with an orifice 41 (see Fig. 9) extending over a considerable arc, and in assembling the machine the guard plate is fixed against rotation relative to the hopper either by being tightly seated in its seat 9 or by any other well-known means, not shown, and completely separates the passageway 12 from the interior of the container 4.

The shaft having the pivot 20, journal 23 and angular attaching portions 24, 25, is provided also with a journal 42 that is journaled in a central opening 43 provided therefor in the guard plate 40. The portions 42, 25, 23, 24 and 20 are of reduced size in the order named, so that the lower end of the shaft can be inserted downward through the orifices in the plate 40 and floor 11, and can then receive in their order the ratchet wheel 26, the actuating element 16 and the nut 22, which is screwed onto the lower threaded end 44 of the shaft.

It is thus seen that by oscillating the actuating element 16 to bring the shoulders or spacers 21 alternately into engagement with the lug or stop 15 the pockets or charge-receiving chambers 39 will be successively brought around into the space between the closed portion of the plate 40 and the downward passage of the hopper, thus allowing any of the material that may be contained in the pocket to drop through the passage 12, and thence out of the hopper. The shaft has an upper extension 45 and its upper end is journaled in a support 46 that may be formed by any suitable means as a box extending down from the lid 47 that covers the upper opening of the container 5. Within the chamber of said container there are provided stirring arms 48 and said arms are provided with hubs 49 fitted to the shaft body 45 and fixed thereto by set screws 50. The lower one of the stirring arms 48 is preferably mounted close to the top of the guard-plate 40 and said arm rotates over said guard-plate as the shaft is rotated by the oscillation of the actuating device, thus scraping material from off of the closed portion of the guard-plate into slot 41 therein, so that such material will fall into the pockets.

The actuating device in the instance shown is constructed of a frusto-conical form, being a continuation of a downwardly tapered frusto-conical hopper and is hollowed out at 51 throughout a considerable arc to form a downward continuation of the passage 12 in whatever position the actuating device may be brought during its oscillation, so that the substance discharged from any pocket into passage 12 will freely fall through said passage and through the hollowed-out space 51 into the vessel 52 seated beneath the hopper to receive the charge.

In practical operation the attendant will oscillate the actuating device in the direction of the arrow, Figs. 4 and 8, by means of the handle 17 and at each oscillation the pawl 28 engaging one of the main teeth 53 of the ratchet wheel will move said ratchet wheel, the shaft and the charge-delivering device a predetermined distance covering the requisite travel of a pocket from position over the floor 11 to position registering with the downward passage 12. Said downward passage is of substantially the same size as the open bottom of the pocket when it is at its largest adjustment, so that at all times the charge in the pocket will be allowed to fall through the passage.

The main teeth 53 equal in number the pockets 39 and they are relatively arranged with respect to the pawl 28, so that at each operative oscillation of the actuating device the charge delivering device will be moved to bring the pocket from its bottom closed position to its bottom open position. The guard-plate 40 thus always affords a closure for the top of the pocket when the bottom of the pocket is open, and only the measured portion of the malted milk or other substance contained in the pocket can be delivered.

The pockets are adjusted before use to the required size. This can be done at any time by removing the guard-plate 40, loosening the screws 37 and sliding the gage members 33 out or in to diminish or increase the charge.

I claim:

1. A malted milk dispenser comprising a hopper having a downward passage, a guard-plate extending over said passage, a chamber formed between said passage and the guard-plate, a charge delivering device rotatable in said chamber and provided with pockets open at the top and bottom to receive a charge from the hopper in one position and to deliver it through the passage in another position, and oscillating means to rotate the charge-delivering device from pocket filling to pocket discharging position.

2. A dispenser comprising a hopper having a rim: a downwardly sloping wall extending from said rim: a seat at the lower end of said wall: a chamber below the level of the seat, a floor below the chamber, and a downward passage through the floor: a container seated in the rim: a guard-plate seated in the seat: a charge-delivering device mounted in the chamber: said guard-plate being provided with a closed portion over the passage and having an opening to allow material from the container to fall into said chamber, said charge-delivering device being provided with pockets open from the guard-plate to the floor and said charge-delivering device being adapted to be moved from a position where one of said pockets is closed by the floor and open to the container to another position where said pocket is open to the downward passage and closed to the container by the closed portion of the guard-plate: and means to move said charge-delivering device.

3. A dispenser comprising a hopper having a rim: a seat within said rim: a chamber below the level of the seat, a floor below the chamber, and a downward passage through the floor: a container seated in the rim: a guard-plate seated in the seat: a charge-delivering device mounted in the chamber: said guard-plate being provided with a closed portion over the passage and having an opening to allow material from the container to fall into said chamber, said charge-delivering device being provided with pockets open from the guard-plate to the floor and said charge-delivering device being adapted to be moved from a position where one of said pockets is closed by the floor and open to the container to another position where said pocket is open to the downward passage and closed to the container by the closed portion of the guard-plate: and means to move said charge-delivering device.

4. A malted milk dispenser comprising a hopper having a downward passage, a guard-plate extending over said passage, an annular chamber formed between said passage and guard-plate, a charge-delivering device rotatable in said chamber and having radial arms, pockets formed between said arms to receive a charge from the hopper in one position and to deliver it through the passage in another position, said pockets comprising parallel side walls and a movable transverse wall, the transverse wall having a top overhanging member and being adapted to be moved back and forth between said parallel side walls to contract or expand the pocket, said overhanging member being adjustably secured upon the top of the charge-delivering device to adjustably position the transverse wall and thereby regulate the amount of the charge, and means connected to rotate the charge-delivering device from pocket-filling to pocket-discharging position.

5. A malted milk dispenser comprising a hopper having a downward passage, a guard-plate extending over said passage, an annular chamber formed between said passage and guard-plate, a charge-delivering device rotatable in said chamber and having radial arms, pockets formed between said arms to receive a charge from the hopper in one position and to deliver it through the passage in another position, said pockets comprising parallel side walls having ways at the tops thereof, a transverse wall having a top overhanging member and being adapted to be moved back and forth between said parallel side walls to contract or expand the pocket, said overhanging member running in said ways and being adjustably secured upon the top of the charge-delivering device to adjustably position the transverse wall and thereby regulate the amount of the charge, and means connected to rotate the charge-delivering device from pocket-filling to pocket-discharging position.

6. A dispenser comprising a hopper having a downward passage, a guard-plate extending over said passage, a chamber below said guard-plate, a floor below the chamber, a charge-delivering device mounted in the chamber and provided with pockets to receive a charge from the hopper in one position and to deliver it through the passage in another position, a shaft secured to said charge-delivering device and extending through the floor, a ratchet wheel secured to the shaft below the floor, an actuating member mounted to freely turn upon said shaft, and a pawl upon the actuating member adapted to engage with the ratchet wheel to turn the shaft whenever the actuating member is turned in one direction to thus rotate the charge-delivering device from pocket-filling to pocket-discharging position.

7. A malted milk dispenser comprising a hopper, a container seated over said hopper, a guard-plate seated in the hopper below said container, a chamber below the level of the guard-plate and provided with a downward passage in its floor, a charge-delivering device mounted in said chamber and provided with pockets open at the top and bottom to receive a charge from the hopper in one position and to deliver it through the passage in another position, a shaft secured to said charge-delivering device and having an upper extension passing through said guard-plate into the container and a lower portion extending through said floor, an actuating member mounted upon said lower shaft portion to rotate the charge-delivering device from pocket-filling to pocket-discharging position, and stirring means mounted upon said upper shaft extension to agitate the contents of the container as the charge-device is rotated.

8. A dispenser comprising a hopper having a downward passage, a guard-plate extending over said passage, a chamber below said guard-plate, a floor below the chamber, a charge-delivering device mounted in the chamber and provided with pockets to receive a charge from the hopper in one position and to deliver it through the passage in another position, a shaft secured to said charge-delivering device and extending through the floor, a ratchet wheel secured to the shaft below the floor, an actuating member mounted to freely turn upon said shaft below said ratchet, and a pawl upon the actuating member adapted to engage with the ratchet wheel to turn the shaft in one direction as the actuating member is turned, an inwardly projecting stop on said hopper below the floor, and a spacer on the actuating member extending into the horizontal plane of said stop and adapted to limit the turning movement of said actuating element to thereby rotate the charge-delivering device from pocket-filling to pocket-discharging position.

9. A dispenser comprising a hopper having a downwardly-tapering frusto-conical discharge-way, a guard-plate seated in the hopper, a chamber below said guard-plate and provided with a passage opening into said frusto-conical discharge-way, a charge-delivering device mounted in the chamber and provided with pockets to receive a charge from the hopper in one position and to deliver it through the passage in another position, a shaft secured to said charge-delivering device and passing into the discharge-way, a hollow frusto-conical actuating device rotatably mounted upon said shaft and forming a continuation of the downwardly tapering frusto-conical discharge-way, and ratchet means connecting said actuating device to the shaft to turn the same in one direction to rotate the charge-delivering device from pocket-filling to pocket-discharging position.

10. A dispenser comprising a hopper having a downward passage, a guard-plate extending over said passage, a chamber below said guard-plate, a floor below the chamber, a charge-delivering device mounted in the chamber and provided with pockets to receive a charge from the hopper in one position and to deliver it through the passage in another position, a shaft secured to said charge-delivering device and extending through the floor, a ratchet wheel secured to the shaft below the floor, an actuating member mounted to freely turn on said shaft, a pawl upon the actuating member adapted to engage with the ratchet wheel to turn the shaft in one direction as the actuating member is turned, and stop means on said hopper below the floor, said actuating member being adapted to engage with said stop means to limit the turning movement of said actuating member and thereby rotate the charge-delivering device from pocket-filling to pocket-discharging position.

In testimony whereof, I have hereunto set my hand at Los Angeles, California, this 15th day of May, 1915.

ARTHUR L. ANDERSON.

In presence of—
JAMES R. TOWNSEND.